United States Patent
Yagyu

(10) Patent No.: US 6,739,789 B2
(45) Date of Patent: May 25, 2004

(54) FLANGED BALL PIN AND METHOD FOR MANUFACTURING THEREOF

(75) Inventor: Walter Takeo Yagyu, Sao Bernardo do Campo (BR)

(73) Assignee: Dana Industrial, Sao Paulo (BR)

( * ) Notice: Subject to any disclaimer, the term of this patent is extended or adjusted under 35 U.S.C. 154(b) by 0 days.

(21) Appl. No.: 09/953,942

(22) Filed: Sep. 18, 2001

(65) Prior Publication Data
US 2002/0051678 A1 May 2, 2002

(30) Foreign Application Priority Data
Oct. 27, 2000 (BR) ............................................. 0005353

(51) Int. Cl.[7] ................................................ F16C 11/00
(52) U.S. Cl. ...................................... 403/134; 403/122
(58) Field of Search ................................ 403/122, 128, 403/134

(56) References Cited
U.S. PATENT DOCUMENTS 5,152,628 A * 10/1992 Broszat et al. .............. 403/122
5,417,512 A * 5/1995 Chamberlin ............ 403/122 X
5,649,779 A * 7/1997 Martin et al. ........... 403/122 X
5,876,149 A * 3/1999 Dorr et al. .............. 403/122 X

* cited by examiner

Primary Examiner—John R. Cottingham
(74) Attorney, Agent, or Firm—Liniak, Berenato & White

(57) ABSTRACT

The invention refers to a flanged ball pin to be utilized in steering and suspension systems of automotive vehicles, and a method for manufacturing thereof. The ball pin includes two separate pieces: a single-piece ball rod having a spherical ball portion and a cylindrical shank member, and an annular flange member secured over the shank member. The method for manufacturing the ball pin is preformed in the following manner: first, the single-piece ball rod is formed, and the annular flange member is manufactured, so that diameter of the shank member and a diameter of an opening in the flange member are dimensioned for an interference fit. Then, the flange member is mounted over the shank member and slid along the shank member until the flange member engages a stop flange on the shank member and is secured about the shank member by interference fit.

9 Claims, 1 Drawing Sheet

FLANGED BALL PIN AND METHOD FOR MANUFACTURING THEREOF

BACKGROUND OF THE INVENTION

1. Field of the Invention

The present invention relates to ball joint assemblies, and more particularly to a structure of a flanged ball rod for a spherical joint assembly for steering and suspension systems of automotive vehicles.

2. Description of the Prior Art

Ball joint assemblies of steering and suspension systems of automotive vehicles are well known in the prior art. Typically, the ball joint assembly comprises a casing defining a cavity having a cylindrical or spherical form, a bearing member disposed within the casing, and a ball pin having a ball portion slidably supported within the bearing member. The ball joint assemblies are used to mechanically couple two components of the vehicle steering and suspension systems. One of the components is secured to the casing of the ball joint assembly, while the other components is secured to the ball rod, thus providing the angular and rotational movement therebetween.

The typical ball pin has a substantially spherical head member at its one end and an elongated substantially cylindrical shank member at its other end. The head portion of the ball rod is coupled to the single or divided bearing member and is housed within the cavity of the ball joint casing. The shank member of the ball pin is provided with an integrally formed annular flange member. The flange of the ball pin is responsible for providing the adequate condition for positioning and securing of the components of the steering or suspension system to be pivotally coupled.

The flanged ball pins are typically manufactured by metal forming, such as forging, or machining from metallic materials, as an integral single-piece part. However, this requires the use of expensive steel alloys of superior grade providing necessary strength and deformability, thus increasing manufacturing cost of the ball joint assembly. Moreover, there is the need of more rigorous manufacturing cares, because of the accumulation of areas subject to mechanical stresses (cracks).

SUMMARY OF THE INVENTION

The present invention provides a novel arrangement of a ball joint assembly for use in a motor vehicle, and a method for manufacturing thereof.

The spherical joint assembly in accordance with the present invention comprises a ball pin, a bearing receiving a ball portion of the ball pin, a casing housing the bearing, and a protective cap having a first end secured to the casing and a second end mounted about a shank member of the ball pin. The ball pin of the present invention includes two separate pieces: a single-piece ball rod having a spherical ball portion at its one end and an elongated substantially cylindrical shank member at its other end, and a separately manufactured annular flange member selectively positioned over the shank member of the ball rod and secured thereto by interference (press) fitting.

Preferably, the shank member of the ball rod is provided with an integral stop flange for accurate positioning of the flange member on the shank member.

In accordance with the first embodiment of the ball pin of the present invention, a front face of the flange member facing the ball member of the ball pin, has generally frusto-conical surface that allows its application in ball joints that demand greater angular movement, without a flange edge damaging the protective cap provided on the ball joint assembly. Alternatively, in accordance with the second embodiment of the ball pin of the present invention, the flange member has flat and substantially parallel opposite faces.

A novel method for manufacturing the ball pin in accordance with the present invention is preformed in the following manner: first, the ball rod is formed, preferably by metal deforming, and the annular flange member is manufactured. Then, the flange member is mounted over the shank member of the ball rod. Finally, the flange member is secured about the shank member by interference fit.

Therefore, the ball joint assembly in accordance with the present invention, and a method for manufacturing thereof, represent an improved arrangement that allows greater dimensional accuracy and considerable reduction of the manufacturing cost, as it simplifies the design, increases the working life of the metal forming tools and, considerably decreases the loss of material in the process and contributes to the preservation of the environment, providing saving of electric energy.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
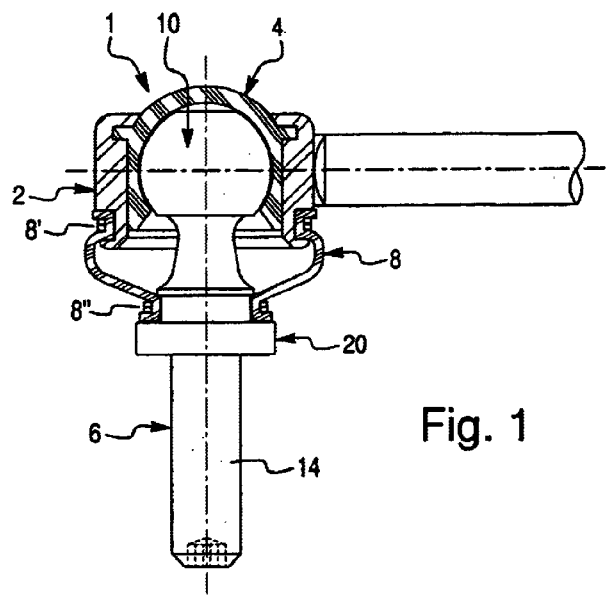
FIG. 1 illustrates a ball joint assembly of the present invention.

Referring first to FIG. 1, a ball joint assembly 1, to which the present invention can be applied, includes a casing 2 defining a cavity having a cylindrical or spherical form, a bearing member 4 disposed within the casing, a ball pin 6 slidably supported within the bearing member 4, and a flexible protective cap 8 preventing the penetration of impurities into the casing 2. The protective cap 8 is made of elastic material, such as rubber, polyurethane or soft-type synthetic resin.

Figure 2:
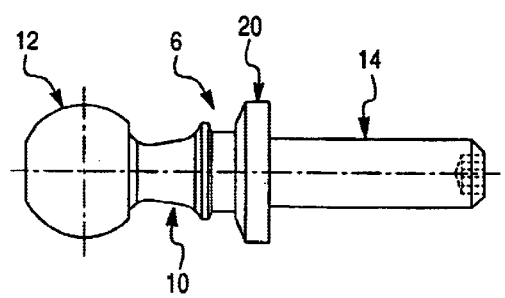
FIG. 2 illustrates a ball pin manufactured with the flange member in accordance with the first embodiment of the present invention.

As illustrated in detail in FIG. 2, the ball pin 6 comprises two separate pieces: a ball rod 10 and a flange member 20 non-removably secured to the ball rod 10.

Figure 3:
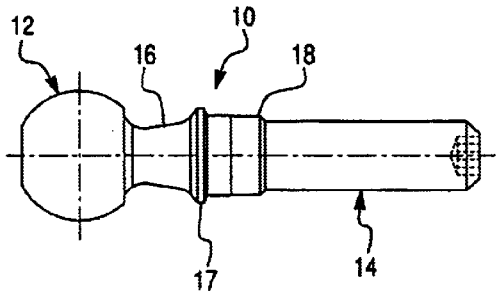
FIG. 3 illustrates a ball rod in accordance with the present invention.

The ball rod 10, as illustrated in detail in FIG. 3, comprises substantially spherical ball member 12 and an elongated generally cylindrical shank member 14 extending from the ball member 12. The spherical ball member 12 is received in the bearing member 4, which, in turn, is housed in the interior cavity defined by the ball joint casing 2.

The shank member 14 of the ball rod 10 includes a neck portion 16 juxtaposed to the ball member 12 of the ball rod 10. The neck portion 16 has reduced diameter relative to the rest of the shank member 14, thus increasing limits of angular movement of the ball pin 6 relative to the casing 2.

Figure 4:
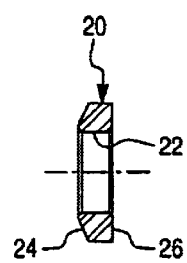
FIG. 4 illustrates a flange member in accordance with the first embodiment of the present invention.

The flange member 20, in accordance with the first embodiment of the present invention, illustrated in FIG. 4, is in the form of an annular ring provided with a substantially cylindrical opening 22 therethrough adapted for receiving the shank member 14 of the ball rod 10. The flange member 20 has a front face 24 facing the ball member 12 of the ball rod 12, and a rear face 26. The front face 24 has a substantially frusto-conical surface that allows its application in ball joints that demand greater angular movement, without damaging the protective cap 8 by an edge of the flange member 20 provided on the ball joint assembly 1.

Figure 5:
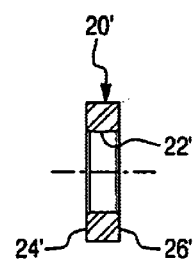
FIG. 5 illustrates a flange member in accordance with the second embodiment of the present invention.
Figure 6:
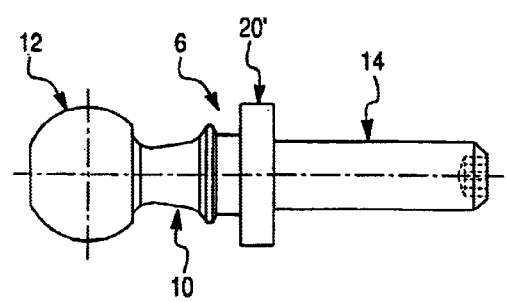
FIG. 6 illustrates the ball pin manufactured with the flange member in accordance with the second embodiment of the present invention.

Alternatively, a flange member 20' in accordance with the second embodiment of the present invention illustrated in FIG. 5, has flat and substantially parallel opposite front and rear faces 24' and 26'. The ball pin 6 having the flange member 20' in accordance with the second embodiment of the present invention is shown in FIG. 6.

Preferably, as illustrated in FIG. 3, the shank member 14 of the ball rod 10 is provided with an integral stop flange 18 for accurately positioning the flange member 20 on the shank member 14 for securing thereto.

Furthermore, the shank member 14 of the ball rod 10 is provided with an integral crown portion 17 radially extending from the shank member 14 adjacent to the neck portion 16.

The protective cap 8 has a first end 8' secured around the casing 2 and a second end 8" mounted about the shank member 14 of the ball rod 10 between the crown portion 17 and the flange member 20.

The ball rod 10 is preferably manufactured by metal forming, such as forging, or machining from metallic materials, as an integral single-piece part.

A method for manufacturing the ball pin 6 in accordance with the present invention is preformed in the following manner: first, the single-piece ball rod 10 is formed, and the annular flange member is manufactured, so that diameter of the shank member 14 in adjacent to the stop flange 18 and a diameter of the opening 22 of the flange member 20 are dimensioned for an interference fit. Then, the flange member 20 is mounted over the shank member 14 of the ball rod 10 and slid along the shank member 14 until the flange member 20 engages the stop flange 18 and is secured about the shank member 14 by interference fit.

It will be appreciated that the flange member 20 may be secured about the shank member 14 of the ball rod 10 by any other appropriate means known in the art, such as welding or adhesive bonding.

Furthermore, the ball pin 10 in accordance with the present invention allows mounting the protective cap 8 to the ball joint assembly 1 before securing the flange member 20 to the shank member 14 of the ball rod 10. This would alleviate the need for a specific tool for mounting of the second end 8" of the protective cap 8 over the flange member 20, as without the flange member 20 the mounting of the protective cap 8 may be completed with no any additional effort and special tool, after which the flange member 20 can be secured about the shank member 14 of the ball rod 10.

Therefore, the ball joint assembly in accordance with the present invention, and a method for manufacturing thereof, represent an improved arrangement that allows greater dimensional accuracy and considerable reduction of the manufacturing cost, as it simplifies the design, increases the working life of the metal forming tools and, considerably decreases the loss of material in the process and provides saving of electric energy.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A ball pin utilized in a ball joint assembly, said ball pin comprising:
   a ball rod having a substantially spherical ball member and an elongated shank member extending from said spherical ball member, said shank member having a first non-threaded contact surface is formed integrally with said ball member;
   said ball joint assembly including a protective cap mounted about said shank member of said ball rod; and
   a flange member having a second non-threaded contact surface engaging said first non-threaded contact surface of said shank member to permanently secure said flange member about said shank member, said flange member provided for supporting said protective cap.

2. The ball pin as defined in claim 1, wherein said shank member is provided with an integral stop flange for positioning said flange member on said shank member.

3. The ball pin as defined in claim 1, wherein said flange member is in the form of an annular ring.

4. The ball pin as defined in claim 1, wherein said flange member is secured about said shank member by interference fit.

5. The ball joint assembly as defined in claim 1, wherein said flange member has a front face facing said ball member, said front face has a substantially frusto-conical surface.

6. The ball joint assembly as defined in claim 1, wherein said flange member has a front face facing said ball member, said front face has a flat surface perpendicular to said shank member of said ball rod.

7. The ball pin as defined in claim 1, wherein said shank member is further provided with an integral crown portion disposed between said ball member and a front face of said flange member and axially spaced from said front face of said flange member.

8. A ball pin utilized in a ball joint assembly, said ball pin comprising:
   a ball rod having a substantially spherical ball member and an elongated shank member extending from said spherical ball member, said shank member having a first non-threaded contact surface is formed integrally with said ball member;

an annular flange member having a second non-threaded contact surface engaging said first non-threaded contact surface of said shank member to permanently secure said flange member about said shank member by interference fit, said flange member having a substantially frusto-conical front face facing said ball member; and a crown portion formed integral with said shank member and disposed between said ball member and said flange member and axially spaced from said front face of said flange member, wherein said shank member is provided with an integral stop flange for positioning said flange member on said shank member, and wherein a protective cap is mounted about said shank member of said ball rod between said crown portion and said flange member.

9. A ball pin utilized in a ball joint assembly, said ball pin comprising:

a ball rod having a substantially spherical ball member and an elongated shank member extending from said spherical ball member, said shank member having a first non-threaded contact surface is formed integrally with said ball member;

an annular flange member having a second non-threaded contact surface engaging said first non-threaded contact surface of said shank member to permanently secure said flange member about said shank member by interference fit, said flange member having a substantially flat front face perpendicular to said shank member of said ball rod and facing said ball member; and a crown portion formed integral with said shank member and disposed between said ball member and said flange member and axially spaced from said front face of said flange member, wherein said shank member is provided with an integral stop flange for positioning said flange member on said shank member, and wherein a protective cap is mounted about said shank member of said ball rod between said crown portion and said flange member.

* * * * *